Feb. 14, 1928. Re. 16,879

E. MAYER

DEVICE FOR OPTICALLY MEASURING LIGHT, PHOTOMETER

Original Filed Aug. 27, 1923

INVENTOR
Emil Mayer

BY Mock & Blum
ATTORNEYS.

Reissued Feb. 14, 1928. Re. 16,879

UNITED STATES PATENT OFFICE.

EMIL MAYER, OF VIENNA, AUSTRIA, ASSIGNOR TO DREM PRODUCTS CORPORATION, OF NEW YORK, N. Y., A CORPORATION OF NEW YORK.

DEVICE FOR OPTICALLY MEASURING LIGHT, PHOTOMETER.

Original No. 1,587,539, dated June 8, 1926, Serial No. 659,456, filed August 27, 1923, and in Austria April 28, 1923. Application for reissue filed April 27, 1927. Serial No. 187,104.

My invention relates to a new and improved exposure meter.

One of the objects of my invention is to provide an exposure meter which will enable the user to readily and directly determine the exposure time and in addition the corresponding diaphragm setting, for a still or movie camera provided with a lens or calibered pinhole and also for enlarging or reproducing appliances embodying lenses, so that proper negatives or positives can be secured.

Another object of my invention is to provide an exposure meter which can be operated directly for the above mentioned purposes, by means of light which is transmitted, refracted, reflected or is radiated from or emanates in any manner from the object to be photographed or reproduced.

Other objects of my invention will be set forth in the following description and drawings which illustrate a preferred embodiment thereof, it being understood that the above general statement of the objects of my invention is intended merely to generally explain the same.

Figure 1:
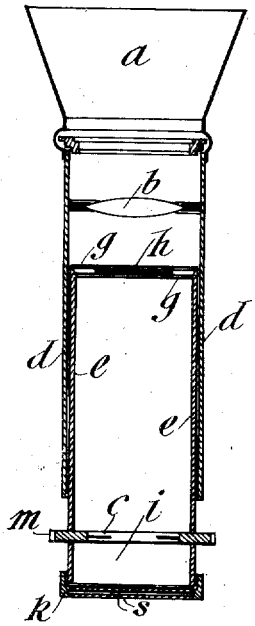
Fig. 1 is a vertical section of one embodiment of my device, the upper part being shown in elevation.

In the construction shown in Fig. 1, a number of light comparing sections *h* of gradually varying translucency are provided.

Figure 2:
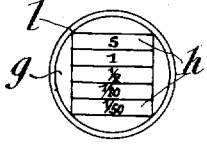
Fig. 2 is a diagrammatic plan view showing one of the possible arrangements of the transmitting sections.

As shown in Fig. 2, these comparing sections may be arranged, side by side, although my invention is not limited to any particular arrangement of the said comparing sections. Each of these sections has an identifying mark such as a numeral or symbol formed thereon and a light contrast is provided between each section and its identification, so that the identifying numeral or symbol is visible when the proper amount of light is passed through the respective section.

For example, each of the comparing sections may be translucent and the identifying numerals may then be given a black or other contrasting color. If the comparing sections have one of their faces given a black color then the identifying numerals can be rendered visible by simply omitting the black coloration at the part of each said section corresponding to the outline of the identifying numeral.

These comparing sections are held in position between two transparent panes *g* made of glass or any other suitable material which is permeable to light. Of course, the comparing sections can be directly formed upon a sheet of glass of varying thickness or coloring so as to provide the requisite difference in light permeability. The comparing sections are mounted at the top of a tube *e* which is provided with an ordinary iris diaphragm *c*. I do not wish to limit my invention to the use of an iris diaphragm as there are other known devices for regulating the brightness of the admitted light bundle, like Waterhouse stops, wedge-shaped slits, etc. This diaphragm *c* is actuated by a ring *m* which can be manipulated on the outside of the tube so as to open or close the diaphragm.

I have not shown the details of construction of the iris diaphragm *c* as this in itself is a well known piece of apparatus.

An indicator can be provided upon the ring *m* to co-operate with any ordinary and well known scale, so that the extent to which the diaphragm is opened can be readily determined, and expressed in customary terms.

A sheet of ground glass or other translucent material *i* is located in front of the diaphragm *c* so that the formation of an image within the apparatus, the so-called pin-hole effect, is prevented when a diaphragm opening is very narrow. The tube *e* on which the comparing sections, the iris diaphragm and the outer sheet *i* are mounted, is slidably mounted within an outer tube *d* provided with an ordinary magnifying lens *b*. The usual flaring end *a* is provided so as to protect the eye of the observer from external light.

In the embodiment shown in Fig. 1, a removable cover *k* is provided for the end of the inner tube *e* and this tube contains two sheets *s* made of glass or other transparent material between which members of varying light permeability can be located. This is for the purpose of subduing very bright light, or otherwise to regulate the brightness of the admitted light bundle.

Figure 3:
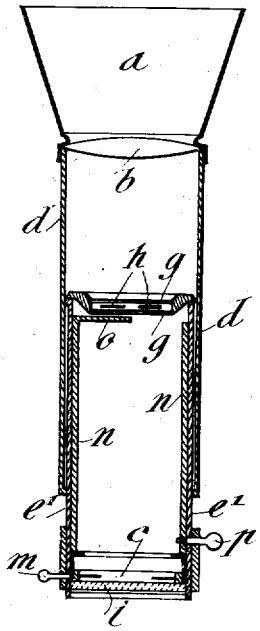
Fig. 3 is a view similar to Fig. 1 and shows a modification of my invention.
Figure 4:
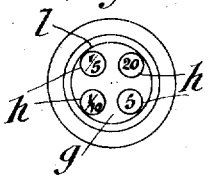
Fig. 4 is a view similar to Fig. 2 and it shows the transmitting sections used in the second embodiment.
Figure 5:
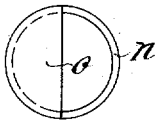
Fig. 5 is a detail view of the second embodiment.

In the embodiment shown in Figs. 3, 4 and 5, an inner tube *n* is located within the tube *e'*. Any desired portion of the inner end of the inner tube *n* can be covered by an inner opaque covering member *o*, which in this embodiment is shown as semi-circular, so that it covers half the aperture of the said inner tube *n*. The tube *n* can be turned by means of a handle *p* which passes through a slot in the tube *e'*. In this embodiment there are four comparing sections *h* which are arranged as shown in Fig. 4, and as the inner tube *n* is turned by means of the handle *p*, the observer can exclude from the field of vision any of the sections *h*.

Figure 6:
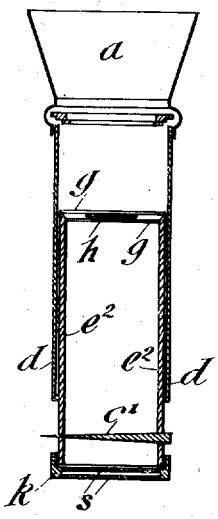
Fig. 6 illustrates a third embodiment.

In the embodiment shown in Fig. 6 the magnifying lens is omitted and a tube *d* of any suitable length is provided in which another tube $e^2$ is slidably mounted. The light comparing sections can be provided by means of a translucent wedge *c'* provided with identifying numerals for adjacent zones thereof. These adjacent zones are of different light permeability due to the difference in thickness of the wedge at various portions thereof.

In the embodiment shown in Fig. 6, any well known means equivalent to an iris diaphragm for regulating the size of the aperture through which the light is admitted can be utilized, thus controlling the brightness of the admitted light bundle, by regulating the aperture.

The method of using this apparatus is as follows:—

In the embodiment shown in Figs. 3–5, for example, the comparing section or field identified by the numeral 1/10 is the least permeable to light. Hence, this numeral, 1/10 for example, can only be observed when the light passing through this section corresponds to sunlit outdoor subjects or the like. If such light conditions are not present, then the numeral 1/10 cannot be seen by the observer. The section or field identified by the numeral 1/5 is somewhat more light permeable from the first mentioned section, so that the numeral 1/5 can be seen by the observer when sunlight is not available, as on cloudy days. Similarly, the numeral 5 identifies a section which is more light permeable than the second mentioned field, as for bright interiors, and the field identified by the numeral 20 has a still greater light permeability, as for dark interiors.

The same relationship exists in the embodiment shown in Figs. 1 and 2.

In the embodiment shown in Figs. 3–5, for example, when the diaphragm is opened to its fullest extent, the light emanating from the object to be photographed, or emanating from the picture or image which is to be reproduced, is perceptible because said light renders one of the sections visible. The observer will see only the numerals on those sections which are sufficiently illuminated by the said light, whose intensity varies according to the conditions present. For example, if the amount of light transmitted is such that the observer can see the numeral 1/5, he will not be able to see the numeral 1/10, and he will be able to see the numerals 5 and 20. The numeral 1/5, namely, the numeral corresponding to the field visible under the prevailing light conditions and having the smallest light permeability, will identify to the observer the light conditions which are present.

The iris diaphragm is then closed to its greatest extent or at least until the numeral disappears and is then reopened until the observer can just see the identifying numeral which corresponds to the light conditions present. The aperture of the iris diaphragm which can be readily indicated by means of a suitable scale, for example, the customary "*f*" scale, and the identifying numeral which indicates directly to the observer the light conditions which are present, enable him to immediately determine the amount of light which is necessary for securing the corresponding negative or positive.

For example, the identifying numeral for the field of smallest light permeability visible under the prevailing light condition can correspond to the time of exposure or the numeral can represent the frequence of frames per second in movie cameras, which determines the exposure time, and the diaphragm setting, as determined by the position of the index at the moment of reappearance of the numeral or symbol, can correspond to the diaphragm setting on the camera or other optical apparatus which is being used. The user can secure the proper combination of exposure time and diaphragm setting, which regulates the amount of light action upon the sensitive material, by either adjusting the shutter speed or the diaphragm setting for the lens which is being used or both. In many cases the diaphragm opening can be immediately adjusted with respect to the shutter speed or timing device so that the sensitive plate is acted upon by the proper amount of light required for a correct exposure.

According to my invention the brightness of the light is measured by means of two combined and independently variable factors, namely, by a device which controls the admission of light (such as an iris diaphragm) and a plurality of fields of varying light permeability which are directly associated with distinguishing marks. That is, according to my invention the distinguishing marks are in the path of the bundle or beam of light rays. This is an improved feature of my invention because due to the action of the human eye it is not possible to determine with sufficient accuracy just when a transparent or translucent field becomes visible, when it is sufficiently illuminated. However, by directly associating a transparent or translucent field with some contrasting or identifying mark which is also illuminated by the beam of light, the necessary determination can be made with sufficient accuracy. I prefer to have the identifying markings such as "1/10" etc. directly indicate exposure time and to be directly located upon the said fields, but I do not wish to limit my invention to this feature as the said identifying marks are directly associated with the fields for the purposes of my invention, if the marks in the fields are simultaneously illuminated in the instrument.

I have described a preferred embodiment of my invention, but it is clear that numerous changes and omissions could be made without departing from its spirit, which is the combination of a plurality of translucent fields selected in accordance to the receptiveness of light sensitive material with a device to regulate the brightness of the admitted light bundle.

I claim:—

1. In an exposure meter, the combination of a plurality of fields of varying light permeability, said fields being located within the field of vision, each of said fields having an identifying mark thereon, adjustable means for regulating the brightness of the admitted light, and manually operated means for excluding selected fields from the line of vision of the observer.

2. A device according to claim 1 in which the said adjustable means consists of an iris diaphragm.

3. In an exposure meter, the combination of a plurality of fields of varying light permeability, said fields being located within the field of vision, the said fields having opaque faces and contrasting light permeable identifying marks formed thereon, means for controlling the brightness of the light which can be caused to pass through the said fields, and means for excluding selected fields from the line of vision of the observer.

4. In an exposure meter, the combination of a plurality of fields of varying light permeability and having identifying marks formed thereon, said fields being located within the field of vision, manually operated means for excluding selected fields from the line of vision of the observer, and additionally manually controlled means for regulating the aperture through which light passes to the said fields.

5. In an exposure meter, the combination of a plurality of fields of varying light permeability, said fields being located within the field of vision, each of said fields having an identifying mark thereon, an iris diaphragm associated with the said fields and adapted to control the size of the aperture through which light can pass through the said fields, a sheet of translucent material associated with the said diaphragm and adapted to prevent the formation of an image in the device when the diaphragm opening is small, and manually operated means for excluding selected fields from the line of vision of the observer.

6. In an exposure meter having an aperture through which light is admitted, the combination of a plurality of fields of varying light permeability, said fields being located within the field of vision, and adapted to be separately identified, means adapted to selectively expose said fields to the beam of light rays, and adjustable means adapted to regulate the brightness of said beam of light in a substantially continuous and uniform manner.

7. In an exposure meter, the combination of a plurality of fields of varying light permeability, said fields being located within the field of vision, each of said fields having identifying means directly associated therewith in the device, means adapted to expose said fields selectively to the action of a beam of light, and means adapted to regulate said beam of light.

8. In an exposure meter, the combination of a plurality of fields of varying light permeability, said fields being located within the field of vision, and adapted to be separately identified by markings directly associated therewith, means adapted to selectively expose said fields to the action of a beam of light, means adapted to regulate said beam of light, and a sheet of translucent material associated with said fields and adapted to prevent the formation of an image in the device when a beam of light of small diameter passes through the device.

In testimony whereof I affix my signature.

DR. EMIL MAYER.